United States Patent
Choi et al.

(10) Patent No.: US 8,533,229 B2
(45) Date of Patent: Sep. 10, 2013

(54) SOAP-BASED WEB SERVICES IN A MULTI-TENANT DATABASE SYSTEM

(75) Inventors: Ryan Choi, San Francisco, CA (US); Craig Weissman, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1671 days.

(21) Appl. No.: 10/870,695

(22) Filed: Jun. 16, 2004

(65) Prior Publication Data

US 2005/0283478 A1  Dec. 22, 2005

(51) Int. Cl.
*G06F 17/30* (2006.01)
(52) U.S. Cl.
USPC ............................ 707/791; 707/716; 707/755
(58) Field of Classification Search
USPC ................................ 707/9, 10, 716, 755, 791
See application file for complete search history.

(56) References Cited

U.S. PATENT DOCUMENTS

| | | | | |
|---|---|---|---|---|
| 5,974,416 A | * | 10/1999 | Anand et al. | 707/10 |
| 6,275,825 B1 | * | 8/2001 | Kobayashi et al. | 707/9 |
| 6,587,854 B1 | * | 7/2003 | Guthrie et al. | 707/9 |
| 6,732,100 B1 | * | 5/2004 | Brodersen et al. | 707/9 |
| 6,836,777 B2 | * | 12/2004 | Holle | 707/101 |
| 6,931,402 B1 | * | 8/2005 | Pereira, III | 707/9 |
| 6,976,262 B1 | * | 12/2005 | Davis et al. | 719/328 |
| 7,000,238 B2 | * | 2/2006 | Nadler et al. | 719/330 |
| 7,076,558 B1 | * | 7/2006 | Dunn | 709/229 |
| 7,330,971 B1 | * | 2/2008 | Kukreja et al. | 713/168 |
| 2002/0016814 A1 | * | 2/2002 | Convent et al. | 709/203 |
| 2003/0154197 A1 | * | 8/2003 | Millet et al. | 707/9 |
| 2004/0122958 A1 | * | 6/2004 | Wardrop | 709/229 |
| 2005/0223008 A1 | * | 10/2005 | Kubota et al. | 707/9 |
| 2005/0267772 A1 | * | 12/2005 | Nielsen et al. | 705/1 |

* cited by examiner

*Primary Examiner* — Thanh-Ha Dang
(74) *Attorney, Agent, or Firm* — Daryl Josephson (57) ABSTRACT

Systems and methods for generating dynamic communication contracts in a multi-tenant database system based on the datamodel of the user using the service. The communication contract contains objects, e.g., SOAP-objects, custom to the specific user's datamodel, including standard objects customized to the user's own security model and business purpose as well as entirely unique custom objects that are created by the user and available to only the user's organization. A database server queries the database for all objects available to that user (standard and custom), and all the fields on all those objects that are available to that user. The server iterates over the set of objects and each of their sets of fields and generates a contract that is specifically tailored to the user's own datamodel and field level security. The unique contract can be used to communicate with the server to access information in the user's own schema. For server-side implementation, all SOAP-objects—standard or custom—are translated across all users into a singular programmatic object on the server, which acts as a datamodel dictionary and which is used for looking up datamodel information for any given user and for any given object available to that user. With this datamodel information, the Web service performs access checking of the SOAP object against the given customer making a request, ensuring both the object and the fields on that object are defined and accessible to the user.

25 Claims, 6 Drawing Sheets

| Org id 201 | Acc id 202 | Data 203 | | | Val0 | Val1 | ... | Val249 | Org id 211 | Acc id 212 |
|---|---|---|---|---|---|---|---|---|---|---|
| | | Name | . | . | | | | | | |
| ood1 | oo1_1 | | . | . | Data type 1 | | | | | |
| ood1 | oo1_2 | | . | . | | | | | | |
| ood1 | ... | | | | | | | | | |
| ood2 | | | | | Data type 2 | | | | | |
| ood2 | | | | | | | | | | |
| ... | ... | | ... | | ... | | | | | |
| oodN | | | | | Data type 3 | | | | | |
| oodN | | | | | | | | | | |

(Account_cfdata) 210

200 { Org #1, Org #2, ..., Org #N }

FIG. 3

| Custom entity id | Org id | Va10 | Va11 | ... | Va1249 | iva10 | iva11 ... ivaN |
|---|---|---|---|---|---|---|---|
| a01 ... 1 | ood1 | Data type 1 | | | | | |
| a01 ... 2 | ood1 | | | | | | |
| a01 ... 3 | ood1 | | | | | | |
| a01 ... 4 | ood1 | | | | | | |
| a02 ... 5 | ood1 | Data type 2 | | | | | |
| a02 ... 6 | ood1 | | | | | | |
| a02 ... 7 | ood1 | | | | | | |
| a03 ... 8 | ood1 | Data type 3 | | | | | |
| a03 ... 9 | ood1 | | | | | | |
| a03 ... 10 | ood1 | | | | | | |
| a03 ... 14 | ood1 | | | | | | |
| a01 ... 15 | ood2 | | | | | | |
| a01 ... 16 | ood2 | | | | | | |
| a03 ... 19 | ood2 | | | | | | |
| a02 ... 20 | ood2 | | | | | | |
| a02 ... 21 | ood2 | | | | | | |
| a02 ... 28 | ood2 | | | | | | |
| a01 ... 29 | ood3 | | | | | | |

Org #1: rows 1–14; Org #2: rows 15–28; Org #N: row 29 ...

FIG. 4

Custom_Entity_Definition 500

| custom_field_defn_id | org_id | table name or id | field name | field data type | Is_Indexed | column_number |
|---|---|---|---|---|---|---|
| 510 | 520 | 530 | 540 | 550 | 560 | 570 |

*FIG. 5*

Custom_Field_Definition 600

| custom_field_defn_id | org_id | entity_name | key prefix |
|---|---|---|---|
| 610 | 620 | 630 | 640 |

SOAP-BASED WEB SERVICES IN A MULTI-TENANT DATABASE SYSTEM

BACKGROUND OF THE INVENTION

The present invention relates generally to multi-tenant databases, and more particularly to systems and methods for dynamically generating network communication contracts for use between a database server and multiple client systems.

Simple Object Access Protocol (SOAP) is an XML-based protocol that provides a means for a system to access servers, services and objects in a platform-independent manner. Using SOAP, a system can communicate with services provided on a remote system without regard to the remote system's location, operating system or platform. The standard model for SOAP-based Web services on the Internet requires a singular contract defined by the server, called a Web Services Definition Language (WSDL), to talk to its Web service. Any client that wants to communicate with the Web service must adhere to that contract, and is restricted to using only the pre-defined strongly-typed objects and methods defined within that contract. These objects are sent over the network from client to server to access the Web service, and are typically useful in requesting information about information provided by the service or in creating and altering the data on the service.

Current implementations of server-side SOAP-based Web services rely on the pre-defined static contracts to enable their implementation. Knowing, a priori, the full set of strongly-typed objects defined in the contract, the server implements unique programmatic objects to map distinctly to each of the individual objects defined in the contract. Upon receiving a SOAP request from the client, the server takes each SOAP-represented object in that request and translates it to a pre-determined programmatic object equivalent. In Java, this would be using Java reflection to populate an instance of a Java class; in .NET, this would be using .NET reflection (e.g., system.reflection package) to populate a C# class.

For implementation, each object in the contract maps distinctly to an individual object on the server. The translation of SOAP-object to server-side object is one-to-one. Because the contract is static, both the objects and the translation of those objects on the server side remains bounded.

This model works well for single-tenant architectures, when the server has a single datamodel for all data being stored in the system across all customers. Regardless of which customers are using the system, the contract is static across all customers and is therefore applicable to all customers. This model, however, would not work well for multi-tenant database systems where multiple datamodels might be stored. In such systems, a single server would be required for each datamodel; clearly an untenable and unscalable solution.

In multi-tenant database systems, such as the salesforce.com service, a multi-tenant architecture is used wherein customer organizations (i.e., tenants) share database resources in one logical database. The database tables themselves are typically shared; each entity in the data model typically contains an organization_id column that distinguishes rows for each tenant. All queries and data manipulation in the context of a tenant filter on this (indexed) organization_id column to ensure proper security and the appearance of virtual private databases. In the salesforce.com system, for example, this strategy is used to expose standard entities such as Account, Contact, Lead, and Opportunity entities to customers.

However, customers may wish to add their own custom data to the database system in addition to the standard entities and fields provided with the standard application. In the salesforce.com system, for example, in which a single server is hosting a unique datamodel for each of the various individual customers, each customer is able to customize the datamodel to his own business purposes. Customization allows customers to add or remove fields from each server object, or create entirely new objects altogether. In effect, the datamodel is dynamic based on which customer is using the service. As a result, no singular server contract can be used to securely define the strongly-typed objects for all of salesforce.com's customers.

Unlike existing SOAP Web service implementations, such a multi-tenant Web service cannot have a unique programmatic object for each contract-defined SOAP-object. Doing so would require the server to dynamically generate and maintain programmatic objects for each customized object in the customer's datamodel. This is not scaleable given the unbounded number of customers and the unbounded number of customizations they can make to their unique datamodel.

Accordingly, it is desirable to provide systems and methods that offer a flexible approach to generating communication contracts for multiple data models so as to overcome the above and other problems.

BRIEF SUMMARY OF THE INVENTION

The present invention provides systems and methods for generating dynamic communication contracts based on the customers using a multi-tenant database service. According to the present invention, when a customer requests a contract to communicate with the server, the server dynamically generates a contract tailored to that customer's own datamodel. This contract contains objects, e.g., SOAP-objects, customized to the specific customer's datamodel, including standard objects customized to his own security model and business purpose as well as entirely unique custom objects that are created by the customer and available to only the customer's organization.

The dynamic contract generation performed by the server is based on the datamodel of the specific customer. The server queries the database for all objects available to that customer (standard and custom), and all the fields on all those objects that are available to that customer. In one aspect, the customer-defined field level security, which can further restrict which fields are available in the contract, is taken into account when generating the contract. The server iterates over the set of objects and each of their sets of fields and generates a contract that is specifically tailored to the customer's own datamodel and field level security. The customer now has its own unique contract with which it can communicate with the server to query, create, update or delete information in his own schema. The customer can either hand-generate SOAP requests to communicate with the server using this contract, or more typically will use a development tool like .NET or Apache Axis to auto-generate code to facilitate transmission of SOAP objects to and from the Web service.

For server-side implementation, in one aspect, the present invention translates all SOAP-objects across all customers—standard or custom—into a singular programmatic object on the server. This singular programmatic object acts as a datamodel dictionary, which is used for looking up datamodel information for any given customer and for any given object available to that customer. With this datamodel information, the Web service performs access checking of the SOAP object against the given customer making a request, ensuring both the object and the fields on that object are defined and accessible to the customer. Advantageously, the singular, datamodel-aware programmatic object of the present invention allows the system to obviate the server-side creation and storage of distinct programmatic objects for each customer's customized objects. It also allows for scaling of a Web service with an unbounded number of customers and custom objects they may create.

According to an aspect of the present invention, a method is provided for dynamically generating a network communication contract in a multi-tenant database server for use between the server and a client system. The method typically includes receiving an authentication request from a client system for a specific user, and responsive to the authentication request, determining a set of objects available to the specific user in the multi-tenant database using one or more metadata tables that describe objects available in the multi-tenant database for each of a plurality of users. The method also typically includes automatically creating a communication contract for the specific user, the contract including an identification of parameters and properties required for accessing each object in the set of objects available to the specific user, sending the communication contract to the client system, and receiving an access request from the client system, the access request identifying a specific object to be accessed. In operation, the server only allows access to the specific object if the access request from the client system adheres to the properties and parameters identified in the contract for that object.

According to another aspect of the present invention, a method is provided for creating a datamodel dictionary for use in communicating with a plurality of users in a multi-tenant database system. The method typically includes accessing a plurality of metadata tables, each metadata table describing one or more objects available to one or more of the plurality of users, and building a single datamodel object using the plurality of metadata tables, the datamodel object including access information for all of the objects available to all of the users across all of the tenants. The access information typically includes, for each object, information identifying one or more users that are allowed to access the object and the parameters and properties required for a client system to access the object.

According to yet another aspect of the present invention, a computer readable medium is provided that stores code for controlling a multi-tenant database system to dynamically generate a network communication contract for use in communicating between the database system and a plurality of client systems. The code typically includes instructions to receive an authentication request from a client system for a specific user, and responsive to the authentication request, determine a set of objects available to the specific user in the multi-tenant database using one or more metadata tables that describe objects available in the multi-tenant database for each of a plurality of users. The code also typically includes instructions to automatically generate a communication contract for the specific user, the contract including an identification of parameters and properties required for accessing each object in the set of objects available to the specific user, send the communication contract to the client system, and receive an access request from the client system, the access request identifying a specific object to be accessed. In operation, the database system only allows access to the specific object if the access request from the client system adheres to the properties and parameters identified in the contract for that object.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 3 illustrates an example of objects represented as a standard main table and an associated custom field table according to an embodiment of the present invention.

DETAILED DESCRIPTION OF THE INVENTION

General System Architecture

Figure 1:
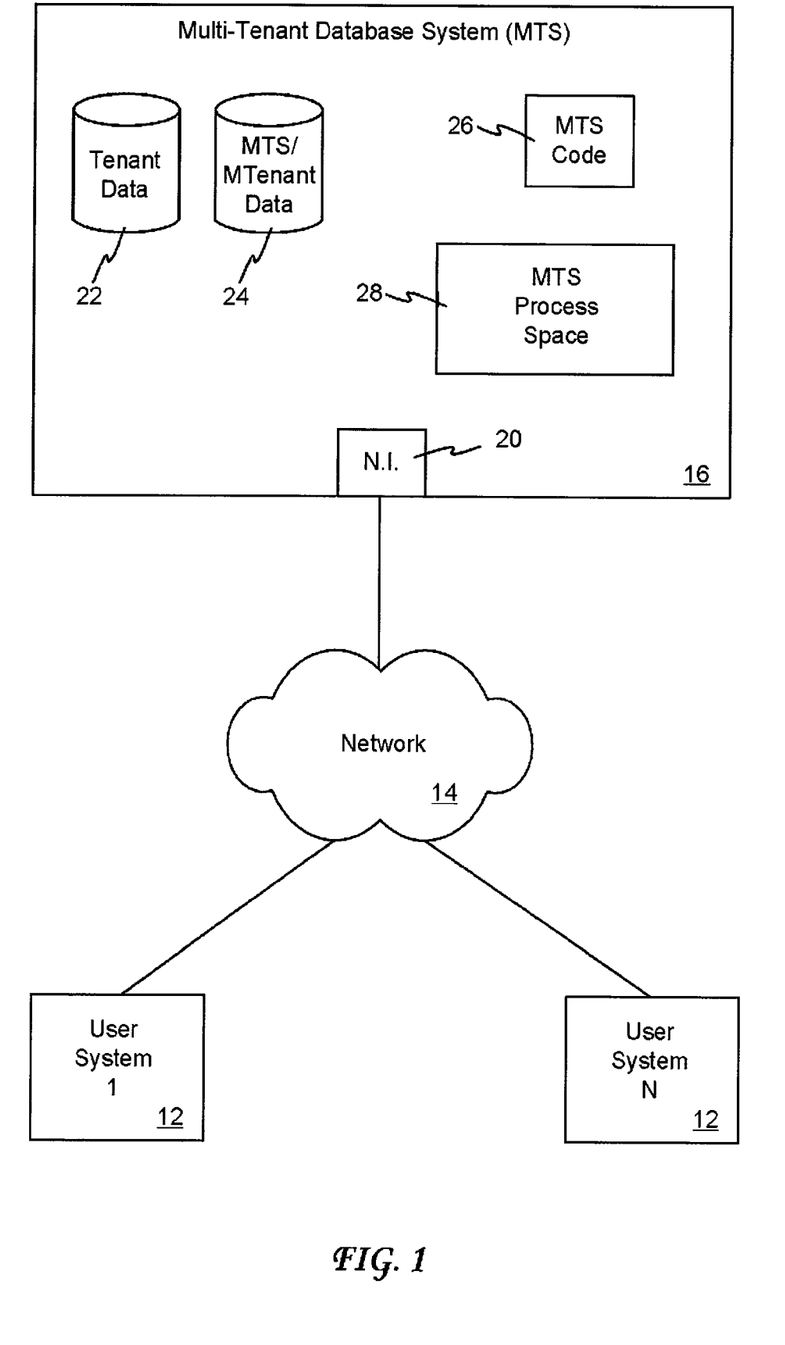
FIG. 1 illustrates an environment wherein a multi-tenant database system (MTS) might be used according to one embodiment.

FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system to interact with MTS 16, that user system has the capacities allotted to that administrator.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein, but it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other interface techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In preferred aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, XML, Java, JavaScript, any other scripting language, such as VBScript and many other programming languages as are well known.

According to one embodiment, each MTS 16 is configured to provide web pages, forms, data and media content to user systems 12 to support the access by user systems 12 as tenants or customers of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
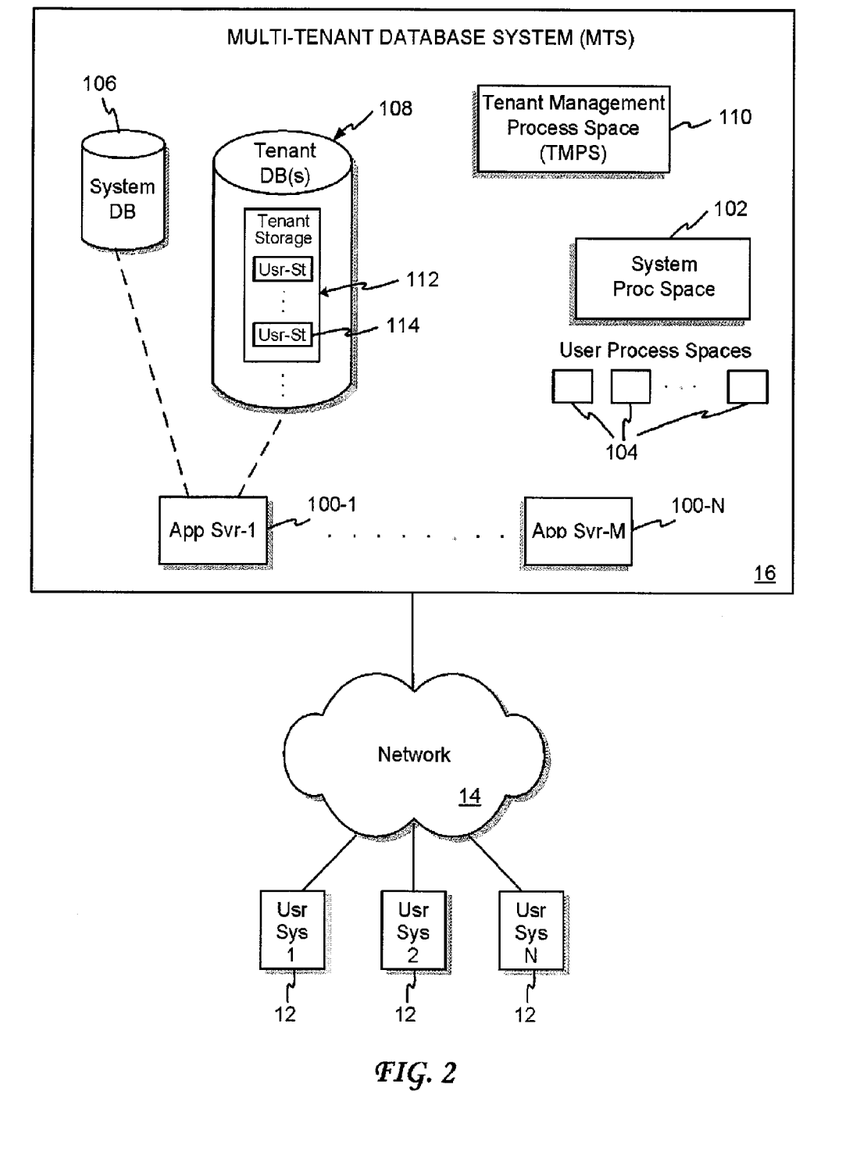
FIG. 2 illustrates elements of an MTS and interconnections therein in more detail according to one embodiment.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In preferred aspects, each application server 100 is configured to handle requests for any specific user of any organization or tenant. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants. It should be appreciated that "user" and "customer" are used interchangeably herein, and that "customer" typically refers to a "user" in a subscription type service such as a CRM service. Also, a "tenant" typically refers to an organization having a plurality of users using MTS 16.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) generates automatically one or more query objects (e.g., SQL statements, or a SQL query) designed to access the desired information.

Each database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided. For CRM database applications, such standard entities might include tables for Account, Contact, Lead and Opportunity data, each containing pre-defined fields.

In a multi-tenant database system, it is desirable to allow users or customers to create custom fields for standard objects as well as to create custom objects. Also, in a multi-tenant database system including such custom objects, it is desirable to provide dynamic communication contract generation techniques, and a singular programmatic object (datamodel dictionary) to facilitate communication with multiple user systems in an efficient, scalable manner.

Custom Fields

According to one embodiment, custom fields may be defined for standard entities. In this embodiment, an additional set of one or more columns, e.g., 10, 100, or 250 columns, of text data are defined in the physical schema for a table such as one for a standard entity. These additional columns, also referred to herein as custom data columns, custom field columns or custom fields, allow a system administrator to define additional fields that are not included in the pre-defined standard fields for that entity. These custom fields preferably have a data-type of VARCHAR (variable length character). In one aspect, these custom fields are preferably stored out of row from the main entity table, although these fields may be stored in the main table. For example, if the main table is called "sales.account" then the custom field data might be stored in a table called "sales.account_cfdata" where "cf" stands for "custom field." Both of these tables preferably contain an organization_id column to distinguish tenant rows, as well as the same indexed primary key (e.g., account id, in this case) that identifies those rows throughout the database. Furthermore, both tables are preferably partitioned physically on the DB (e.g., Oracle DB) to encourage parallelization, for example, when necessary to act on the entire table for maintenance purposes and to maintain shallower indexes.

FIG. 3 illustrates an example of objects represented as a main table 200 and an associated custom field table 210. In the specific example shown in FIG. 3, the main table 200 (.account) represents a standard Account entity and the custom field table 210 (.account_cfdata) includes the custom fields defined by the various organizations (tenants) using the main table 200. As shown, main table 200 includes an organization ID ("org id") column 201 and a table ID (e.g., "acc id" for account id) column 202 that acts as the primary key for table 200. Data table 200 also includes a plurality of data columns 203. In the specific example of FIG. 3, where the table represents a standard entity, data columns 203 are the predefined data columns, or standard fields, that are provided to the various organizations that might use the table. In the standard Account entity example, such standard fields might include a name column, a site column, a number of employees column and others as would be useful for storing account-related information. Each of the data columns 203 is preferably defined to store a single data type per column. The org id column 201 is provided to distinguish among organizations using the multi-tenant account table 200. As shown, N different organizations have data stored in table 200. The org ids in column 201 are preferably Char(15), but may include other data types. In one aspect, the first 3 characters of the org id is set to a predefined prefix, such as "00d", although another subset of characters in the org id may be used to hold such a prefix if desired.

Custom field table 210 similarly includes an org id column 211, a table id column 212 and plurality of data columns 213. As above, table id column 212 acts as the primary key for table 210 and preferably includes the same values as table id column 202 of table 200. In the specific example shown, there are 250 data columns 213 labeled as val0, val1 . . . val249. It is appreciated that any other number may be used as desired, such as, for example, 10 or 100.

When an organization is created initially and associated with database table 200, the custom field columns 213 are empty for that organization. However, every time a record or row is created in the main table (e.g., account) a corresponding row is created in the custom field table—all custom field columns are Null, and therefore take up no space until used.

In one aspect, data is only allowed to enter these custom fields when a new "column" for the organization is defined, e.g., by the administrator for that organization. For example, in the Account entity example, it may be desirable for a specific organization to create one or more additional custom fields, in addition to the standard fields 203, to store specific types of data that may not be accounted for in the predefined standard fields. The present invention advantageously allows an organization to create additional custom columns for such data. Rather than defining a physical column (in Oracle, the definition of which would be placed in the Oracle dictionary catalog) instead this definition is stored in metadata, e.g., in a metadata catalog, which may include one or more metadata tables. The definition of a physical column could likewise be stored in XML or some other format.

Figure 5:
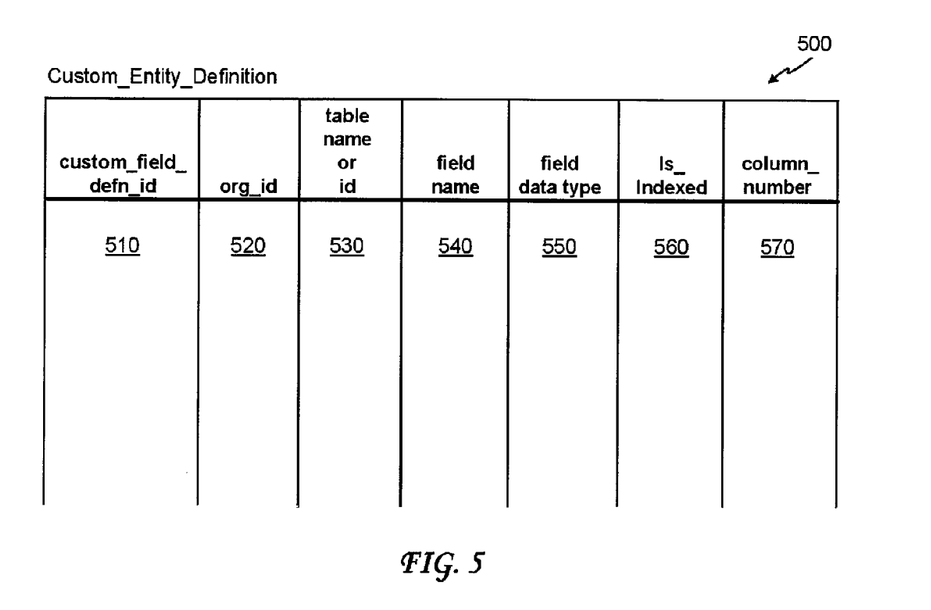
FIG. 5 illustrates a custom field definition metadata table according to an embodiment of the present invention

FIG. 5 illustrates an example of a custom field definition metadata table 500 ("custom_field_definition") according to an embodiment of the present invention. Custom_field_definition metadata table 500 is used to record the name, datatype and other information for each custom field column defined for each organization and table (e.g., standard tables and custom tables, which will be described in more detail below). As shown, metadata table 500 includes custom_field_definition_id column 510, organization_id column 520, table name or id column 530, field name column 540, field datatype column 550, is_indexed column 560 and a column_number column 570. Organization_id column 520 stores the org id of the organization for which the custom field is created, and the custom_field_definition_id column is the primary key for table 500. Table name column 530 stores the names of standard entity tables, such as Account, or the id of custom entity tables created for an organization. Field name column 540 stores the text name of the custom field, and field datatype column 550 stores the data type for the custom field. Examples of data types include text, number, date, picklist, etc. A picklist data type is a text field where the value is chosen from an enumerated list of values. A picklist is typically displayed as a dropdown in the UI. Is_indexed column 560 stores a value indicating whether the field has been flagged for indexing. In one aspect, column 560 stores a boolean value. Column_number column 570 stores the column number (e.g., "val0") assigned to a custom field in custom field table 210 (FIG. 3).

The creation of a new custom field in the application allocates one of the custom field columns 213 to hold the data. In preferred aspects, the lowest numbered columns are filled first. For example, as shown in FIG. 3, the "val0" column is filled first and then the "val1" column and so on for each organization. Therefore, depending on the number of custom columns defined by an organization, each custom field 213 may or may not contain data for an organization. Now, when users of the application in an organization edit rows for that table, the new custom field appears on the screen (or via the API), which will appear the same as all the other standard fields. However, when this data is persisted in the database, the value of the custom field is stored in the designated custom field column in the separate custom field table 210, instead of in the standard main table 200.

In one aspect, a variety of virtual data-types are allowed for these custom fields even though the underlying physical storage may be character based. When the organization's system administrator defines numeric or date custom field types, for instance, then the values are stored as text in a canonical format that allows easy conversion back to the logical data-type. As mentioned earlier, in one aspect, a data type of VARCHAR is preferably used. For instance, in this aspect, dates are stored in the YYYYMMDD format—which allows for conversion via the TO_DATE(<column>, 'YYYYMMDD') function and also allows for proper sorting without doing any conversion. For numbers, the usual decimal format is used, and the Oracle function TO_NUMBER( ) may be used to convert back to numeric values for sorting, mathematical operations, and filtering, etc.

Because the database is multi-tenant, a given physical custom field column may contain data across multiple organizations. For example, because an organization is not limited to specific data types, one organization may define one data type such as a date and another organization may define a different data type such as a string or a number. Therefore it is likely that strings, numbers, and dates will all be found in one physical custom field column. FIG. 3 illustrates an example of a custom field column containing different data types. As shown in the "val0" custom column, for example, the custom column data type defined by organization 1 is data type 1, the custom column data type defined by organization 2 is data type 2, and the custom column data type defined by organization N is data type 3. Data types 1, 2 and 3 may be the same or they may be different. For example, data type 1 may be text, data type 2 may be date, and data type 3 may be number.

In one embodiment, metadata is used to determine the data type(s) in a given custom field column. That is, metadata is used to track the logical data type for each organization in each custom column. In one aspect, a mapping function is created from the metadata. For example, when an organization defines a custom field for a standard entity, a custom field definition is stored in metadata table 500 including the organization id for that organization, the table name (e.g., .account_cfdata) and the column number assigned in the custom table (e.g., val0). In this manner, the data type(s) in any custom column can be determined for efficient data retrieval given the column number, table name and organization id.

U.S. Non-provisional patent application Ser. No. 10/817, 161, filed Apr. 2, 2004, titled "Custom Entities and Fields in a Multi-Tenant Database System", which is incorporated herein by reference in its entirety, discusses additional aspects of custom fields, including, for example, custom field indexing, custom field uniqueness and various additional features, examples and uses.

Custom Tables

It is also desirable to create whole new logical entity tables (entities) for the purpose of extending a base application or for integrating with other systems. For example, an organization using the standard entities provided by the system may desire that one or more new entities be created to specifically cater to, and to facilitate data storage and retrieval for, that organization's particular business model. Accordingly, one embodiment of the present invention provides the functionality to create custom entity tables or custom entities.

As with the approach for custom fields, all custom entity data rows are stored in a single multi-tenant physical table according to one embodiment. However, unlike standard custom field tables, the custom entity data table in one aspect contains multiple logical tables per organization. It is transparent to customers that their multiple "tables" are in fact stored in one large table.

Figure 4:
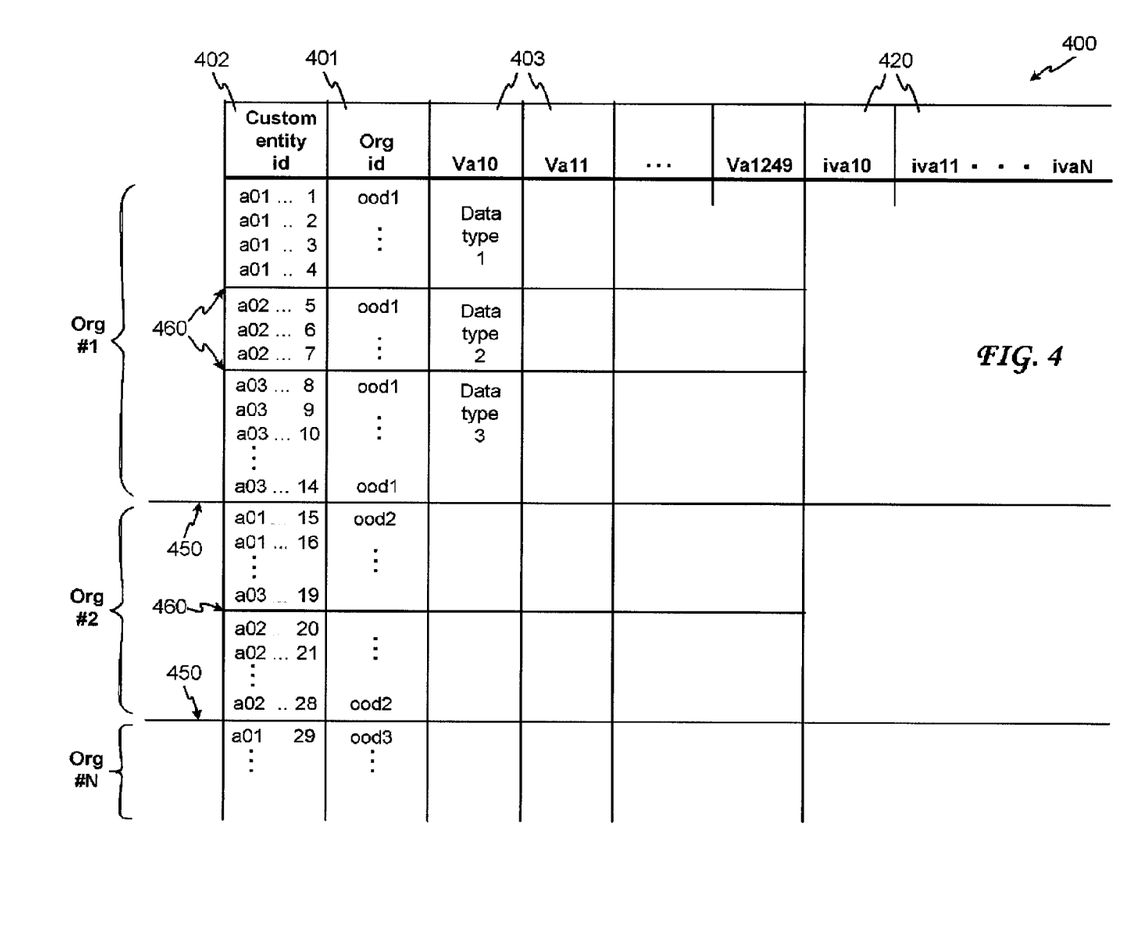
FIG. 4 illustrates an example of a custom object represented as a custom entity table according to one embodiment.

FIG. 4 illustrates an example of a custom object represented as a custom entity table 400 according to one embodiment. Table 400 includes an org id column 401, a custom entity id column 402 and a plurality of custom field columns 403 (labeled "val0", "val1", . . . ). A plurality of optional index columns 420 (labeled "ival0", "ival1", . . . ) may also be provided. The org id column is used to distinguish among the various organizations populating table 400. For example, multiple organizations may create custom entities, all of which are stored to table 400 in one aspect. Custom entity id column 402 is used to distinguish among the various custom entity tables stored in table 400. Custom entity id column 402 also acts as the primary key column for table 400. Custom field columns 403 are used to store the data for the various custom entities defined by the various organizations. Specifically, custom field columns 403 store the columns defined for each of the various custom entities defined by the various organizations populating table 400.

According to one embodiment, the first 3 characters of the globally unique primary key field 402 are used to identify the specific entity type. This technique advantageously allows for multiple custom entity types for one organization to be distinguished in this one custom entity table 400 as will be discussed below. It will be appreciated, however, that fewer or more than the first 3 characters of the primary key may be used to identify entities, or that any sub-combination of characters of the primary key may be used.

Figure 6:
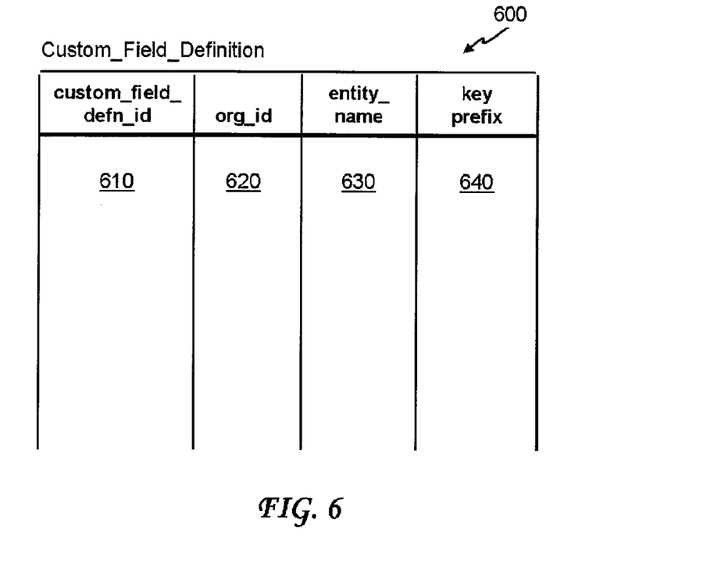
FIG. 6 illustrates a metadata table used to record the name and other information for each custom entity object defined for each organization according to an embodiment of the present invention.

When an organization administrator defines a new custom entity, the definition is stored in the metadata instead of the underlying data dictionary. FIG. 6 illustrates an example of a custom entity definition metadata table 600 ("custom_entity_definition") according to an embodiment of the present invention. When a new custom entity is defined, the database system allocates a unique (within that organization) 3-character prefix for rows of that entity type. In one aspect, the letter 'a' is chosen as the first character of all custom entity primary keys, e.g., a01 . . . a02 . . . a03 . . . aMN . . . . as shown in column 402 of table 400. As shown, across all organizations the same 3-character prefix may be re-used. For example, "a01" is reused as a prefix for multiple organizations. However, the remainder of the custom entity id ensures global uniqueness (and that data from different organizations is never mingled). In one aspect, these 3-character id's are encoded in base62, so that each initial character allows for 62*62=3844 different custom entity types per organization—a large enough number for virtually all uses. It should be appreciated, however, that different encoding bases may be used to provide a fewer or greater number of custom entity types per organization. It should also be appreciated that the custom entity id field may be a composite primary key, for example, spanning two or more columns, one column for the prefix and the other column(s) for the remainder of the custom entity id. For the sake of simplicity, row partitions are not shown in table 400, however organization partitions 450 and entity partitions 460 are shown.

Referring to FIG. 6, custom_entity_definition metadata table 600 is used to record the name and other information for each custom entity object defined for each organization. As shown, metadata table 600 includes custom_entity_definition_id column 610, organization_id column 620, entity_name column 630, and key prefix column 540. Organization_id column 620 stores the org id of the organization for which the custom entity is created, and the custom entity_definition_id column 610 is the primary key for table 600. Entity name column 630 stores the names of the custom entity table, e.g., as a text datatype. Key prefix column 640 stores the 3-character prefix (e.g., "a01", "a02", etc.) allocated for rows of that entity type.

When creating a custom entity table, the administrator for an organization specifies a unique (within the organization) developer name for the custom entity—this is the name used to identify that particular entity for API calls and other developer entry points into the system. This name is stored in the entity name column 630 of table 600. Custom fields may also be defined for custom entities, and where desired, custom fields may be flagged for indexing, as described above. Once custom fields are defined for the custom entity, the organization can begin to use that custom entity like any other standard entity. For example, all API operations (e.g., describe, insert, update, delete, query, search) are available and the organization may define a user interface for editing that custom entity in an online application. Transparent to the users and organization, however, the custom entity table is stored in a single custom entity table 400 along with other custom entity tables defined by that organization as well as other organizations.

One difference in terms of SQL when operating on a custom entity table is the need to filter on the custom entity id in addition to the organization id to ensure that the data from multiple logical entity types within one organization are not mixed together. For example, the leading 3-character portion of the primary key index (e.g., a01 . . . aMN) can be used for this efficient filtering. Thus, filtering on the organization id and the 3-character prefix provides a determination of a specific entity type for the organization. Similarly, an insert PL/SQL call should be told which 3-character prefix to use when inserting a new primary key value and custom entity row.

Similar to custom field columns 213 of FIG. 3, custom field columns 403 may contain multiple data types. For example, when organization #1 defines custom entity table 1 (identified by "a01" for org 1 "00d1" in table 400) a custom field column definition having data type 1 may be allocated to the "val0" column as shown. Similarly, a custom field column definition for a second custom entity table (identified by "a02" for org 1) having data type 2 may be allocated to the same "val0" column as shown. Data types 1 and 2 may be the same or different. In this manner, it is possible that numerous data types may be stored in any given custom field column 403 in custom entity table 400 for the various custom entities defined by the various organizations. Accordingly, using optional index fields 420, an organization is able to flag one or more columns in its custom entities for indexing as described above. Filtering would also proceed similar to that discussed above.

In one embodiment, foreign keys may be defined as a data type when creating custom entities. In this manner a relationship with a standard entity, or another custom entity may be provided to facilitate data storage and retrieval (e.g., reduce redundant data storage). For example, when defining a custom entity, a system administrator may define a custom field as a foreign key data type to establish a relationship with one or more other entities. The primary key for the related entity is copied and stored in that custom field. In one aspect, a plurality of columns is provided to store custom fields of type foreign key. These separate columns may be indexed.

U.S. Non-provisional patent application Ser. No. 10/817,161, filed Apr. 2, 2004, titled "Custom Entities and Fields in a Multi-Tenant Database System", which was previously incorporated herein by reference in its entirety, discusses additional aspects of custom objects, including various additional features, examples and uses.

Dynamic Contract Generation

In one embodiment, MTS 16 generates dynamic communication contracts to facilitate communication between a plurality of client systems 12, each accessing different datamodels. When a user first accesses MTS 16, the system authenticates that a user is valid, e.g., is registered and has permission to access data. The system then queries the database for all objects available to that user and all fields on all those objects that are available to the user. The system iterates over the set of available objects and fields and generates a contract that is custom tailored to that user's datamodel and security level. In preferred aspects, a database server module generates the communication contract, however, other modules of system 16 may implement contract generation functionality, such as for example an application server 100.

Figure 7:
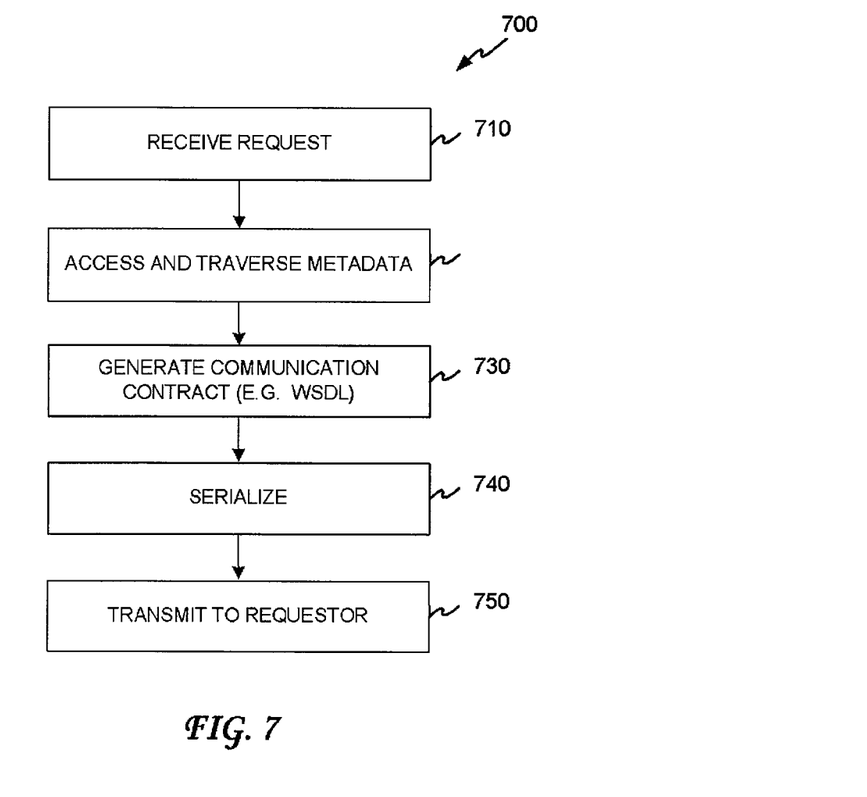
FIG. 7 illustrates a process for generating a communication contract according to one embodiment.

FIG. 7 illustrates a process for generating a communication contract according to one embodiment. In step 710, an authentication request is received from a client system 12. The authentication request (e.g., a login request) typically includes information identifying a particular user of an organization and security information such as a password for the user to access the database for that organization. The identification information and security information are used by system 16 to authenticate that the requesting user is a valid user and to determine the scope of access available to the user on an object-by-object basis, and on a field-by-field basis if field level security is operational for that tenant's data.

In step 720, system metadata describing all objects and fields available in the system is accessed. In one aspect, the system traverses through all objects in an order to determine the set of objects available to that specific user. For example, in one aspect, the metadata tables describing the standard objects and custom fields (e.g., metadata table 500 of FIG. 5), if any, for the standard objects and the metadata tables describing custom objects (e.g., metadata table 600 of FIG. 6), if any, are accessed, and the available objects identified. In one aspect, the objects are traversed in alphabetical order. Alternatively the objects are traversed based on the dates the objects were created. The traversal order applies to both the set of objects as well as the set of fields on each object.

In step 730, the system generates a communication contract using the objects available to that specific user. Information about the objects from the metadata is included in the contract to enable client system 12 to communicate data in an appropriate manner. For example, in one aspect, the included information includes parameters and properties of the objects such as the name of the object, the field(s) and the properties of each field. Such properties might include data type (e.g., simple or complex) used for communication, nillability (e.g., the ability to set an attribute value to null/ml), number of occurrences, and others as will be apparent to one skilled in the art. The system iterates through all available objects in this manner and generates the communication contract specific to that user. In step 740, to facilitate network transmission, the system serializes the contract. In step 750 the serialized contract is sent to the requesting client system 12, e.g., using the protocol(s) appropriate for the network connection between the requesting client system 12 and MTS 16.

On the client side, programmatic objects are generated following the contract. That is, programmatic objects are built in a manner that enforces the properties and parameters as defined in the contract. For example, if the contract dictates that an object be identified by a specific name, that a field be identified by a specific name and that the value of the field have certain properties (e.g., date type having a value greater than a certain date value), the programmatic object must follow those properties. Also, the contract typically requires that the various parameters and properties of an object be presented in a specific order. In one aspect, programmatic objects (e.g., SOAP objects) are built using the communication contract, either via hard coding or using a client side tool such as .NET or similar tool. Once the programmatic object(s) are built, they are serialized and sent to MTS 16.

In one embodiment, on the server side (e.g., MTS 16-side), all objects across all users/customers are translated into a singular programmatic object on the server. Using the metadata, a programmatic object is built that identifies for all users the set of objects available to each user. In one aspect, the programmatic object is a runtime construct embodied in memory. For example, the object may be implemented in an application server 100 using java code that interprets the metadata (e.g., metadata tables 500 and 600) and embodies the object in memory. This object, termed a universal datamodel dictionary (UDD), may be used to provide information to any part of the database system regarding the available schema, functions available on that schema and access to that schema. For example, in a preferred aspect, the UDD is used to perform access checking of a received SOAP object from a client system to determine whether the object(s) and field(s) on an object are defined and accessible to the user (e.g., whether the contract has been adhered to). For example, when MTS 16 receives a request to access an object in the database from a client system 12, the access request (e.g., in a SOAP object) is deserialized and checked against the datamodel dictionary to determine whether the access request adheres to the properties and parameters identified in the contract for each object for which the request may seek access. An access request may include a data processing request such as create, update, query, insert, retrieve, delete, search, and others as will be apparent to one skilled in the art. In one aspect, when a request (e.g., create, update, delete, etc.) is received, the datamodel dictionary for that specific organization is loaded from the database. When the request is completed, the objects may no longer be useful; therefore, in one aspect, they are allowed to be deallocated. This avoids having UDD objects loaded for organizations that are not currently using the system, and avoids using up memory and other system resources.

In preferred aspects, the generated contract is a SOAP-based contract, or a WSDL contract. Appendices A and B show examples of WSDL contracts according to the present invention. Appendix A shows an example of an enterprise WSDL that shows custom objects that are available only to an individual tenant on the system. These objects are distinguished as the ones extending the base sObject and having the name suffixed with "_c". In the enterprise WSDL, custom fields, both on the custom objects as well as standard fields, are shown. These custom fields are distinguished as fields/elements of the sObject objects, and have the name suffixed with "_c". Appendix B shows an example of a client WSDL, which does not have customization at the object level, and defines only a singular sObject with a generic "type" and "any" map, thereby allowing a user to specify both the type of object being used as well as the fields, depending on the object. In one aspect, the client WSDL does not apply the UDD-based techniques of WSDL-generation to provide the user with a WSDL customized for his specific organization. The client WSDL is generic, and applies to all organizations. However, upon making a call (e.g., create, update, delete, etc.), the rules on the server side for resolving the object based on the given organization still apply. On receiving the request, the UDD is used to determine if the user has access to make the given request, has access to the given objects in the request, and has access to the given fields in the request, and if so the request is processed accordingly.

Detailed Descriptions of Objects in the Dictionary

The strongly typed objects defined in the communication contract (e.g., WSDL of Appendix A or B) are useful for data processing (e.g., create, update, retrieve, etc.), and define simple datatypes (e.g., int, string, double, etc.) for each field. These contracts, however, do not contain information on how to present the data in a user interface format. For example, string fields may actually be email fields, have context as an address part (street/city/zip), or be a free-form phone number.

To overcome these limitations, in one embodiment, a "describe object" operation is also provided. According to one aspect, the "describe object" operation returns a detailed description of an individual object, including:

1.) identifying information (e.g., name, custom, label)
2.) the operations that can be performed on each SOAP object (e.g., create, retrieve, query, delete, etc.)
3.) the set of fields available for a given SOAP object, including:
    a. identifying information (e.g., name, custom, label)
    b. the operations that can be performed on each field (e.g., create, update, etc.)
    c. generic data properties (e.g., type, soapType, nillable)
    d. type-specific properties (e.g., scale, precision for numbers, length for strings, possible set of values for enums, picklists, etc.)

The additional metadata information accessible via the SOAP service allows a user system to understand the context of the fields used in the multi-tenant database system. This is useful for determining proper presentment/grouping of data depending on context. Furthermore, as their data dictionary expands to include more custom objects or custom fields, use of the describe operation allows for recognition of changes and accommodations in their code for new fields and such.

Implementation of the describe call is similar to dynamic contract generation. The server queries the database for all objects (standard and custom) available to that customer, and all the fields on all those objects that are available to the customer. Also taken into consideration when generating the objects is the customer-defined field level security, which can further restrict which fields are available in the contract. The server then iterates over the set of objects and, for each object, generates a SOAP-based describe that contains the properties of that object including identifying information, operations available on that object and the set of fields on that object. While iterating over each object's set of fields, the server generates a SOAP-based describe that contains the properties of that field including identifying information, operations available on that field, generic data properties and type-specific properties. This information is then transmitted back to the client over the network.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of dynamically generating a network communication contract in a multi-tenant database server for use between the server and a client system, the method comprising:

determining a set of available objects for inclusion in the network communication contract, the available objects including objects in a multi-tenant database that are available for accessing by a specific user;
automatically creating the network communication contract for the specific user, the network communication contract including an identification of parameters and properties that are required in an access request of the user for accessing each object of the available objects; and
sending the communication contract to a client system corresponding to the user.

2. The method of claim 1, further comprising validating the specific user prior to the determining a set of available objects.

3. The method of claim 1, wherein the determining comprises:
accessing one or more metadata tables of said multi-tenant database; and
identifying all objects associated with the specific user.

4. The method of claim 3, further comprising traversing all objects in the metadata tables in an order.

5. The method of claim 1, wherein the sending comprises serializing the communication contract.

6. The method of claim 1, wherein the determining comprises:
building a datamodel dictionary using one or more metadata tables, said datamodel dictionary identifying a set of objects available for each of a plurality of users of the multi-tenant database; and
responsive to an authentication request from a specific user, checking the datamodel dictionary to determine the set of objects available to the specific user.

7. The method of claim 6, wherein:
each object comprises a plurality of fields, the datamodel dictionary also identifies, for each object, the fields available to each of said plurality of users, and
the checking comprises determining the fields available to the specific user for the set of objects available to the specific user.

8. The method of claim 1, wherein the access request comprises a method call selected from the group consisting of an update call, a query call and an insert call.

9. The method of claim 1, wherein the contract comprises a SOAP contract.

10. The method of claim 1, further comprising:
receiving a describe object request from the client system, the describe object request identifying a specific object; and
returning an object to the client system including detailed information for the specific object.

11. The method of claim 10, wherein the detailed information comprises one or more of information identifying the specific object, operations that can be performed on the specific object and information about the set of fields available for the specific object.

12. The method of claim 1, wherein at least one of the determining, creating and sending is conducted responsive to a request from a client system.

13. The method of claim 12, wherein the request comprises an authentication request.

14. A non-transitory computer readable medium storing code for controlling a multi-tenant database system to dynamically generate a network communication contract for use in communicating between the database system and a plurality of client systems, the code including instructions to:

determine a set of available objects for inclusion in a network communication contract, the available objects including objects in a multi-tenant database that are available for accessing by a specific user;

automatically generate a communication contract for the specific user, the communication contract including an identification of parameters and properties required for accessing each object in the set of available objects; and send the communication contract to a client system corresponding to the user.

15. The non-transitory computer readable medium of claim 14, wherein the code further comprises instructions to validate the specific user prior to the determining a set of available objects.

16. The non-transitory computer readable medium of claim 14, wherein the code is executed in one or more processors in the database system.

17. The non-transitory computer readable medium of claim 14, wherein the instructions to determine comprise instructions to access said one or more metadata tables and identify all objects associated with the specific user.

18. The non-transitory computer readable medium of claim 17, wherein the code further comprises instructions to traverse all objects in the metadata tables in an order.

19. The non-transitory computer readable medium of claim 14, wherein the instructions to send comprise instructions to serialize the communication contract.

20. The non-transitory computer readable medium of claim 14, wherein the instructions to determine comprise instructions to:

build a datamodel dictionary using said one or more metadata tables, said datamodel dictionary identifying a set of objects available for each of said plurality of users; and responsive to an authentication request, check the datamodel dictionary to determine the set of objects available to the specific user.

21. The non-transitory computer readable medium of claim 20, wherein each object comprises a plurality of fields, and wherein the datamodel dictionary also identifies, for each object, the fields available to each of said plurality of users, and wherein the checking includes determining the fields available to the specific user for the set of objects available to the specific user.

22. The non-transitory computer readable medium of claim 14, wherein the code further comprises instructions to return an object to the client system including detailed information for a specific object in response to receiving a describe object request from the client system, the describe object request identifying the specific object.

23. The non-transitory computer readable medium of claim 22, wherein the detailed information comprises one or more of information identifying the specific object, operations that can be performed on the specific object and information about the set of fields available for the specific object.

24. The non-transitory computer readable medium of claim 14, wherein the access request comprises a method call selected from the group consisting of an update call, a query call and an insert call.

25. A multi-tenant database system, comprising:

a database for storing multi-tenant database objects;

one or more processors; and a database management process executing on the one or more processors, the process configured to:

determine a set of available objects for inclusion in a network communication contract, the available objects including objects in the database that are available for accessing by a specific user;

automatically generate the network communication contract for the specific user, the network communication contract including an identification of parameters and properties required for accessing each object in the set of available objects; and send the communication contract to the client system.

* * * * *